(12) United States Patent
Shin

(10) Patent No.: US 6,519,520 B2
(45) Date of Patent: Feb. 11, 2003

(54) SHIFT CONTROL SYSTEM OF AN AUTOMATIC TRANSMISSION AND A METHOD THEREOF

(75) Inventor: Myung-Shin Shin, Kyungki-do (KR)

(73) Assignee: Hyundai Moror Company, Seoul (KR)

( * ) Notice: Subject to any disclaimer, the term of this patent is extended or adjusted under 35 U.S.C. 154(b) by 0 days.

(21) Appl. No.: 09/978,064

(22) Filed: Oct. 17, 2001

(65) Prior Publication Data

US 2002/0065595 A1 May 30, 2002

(30) Foreign Application Priority Data

Oct. 17, 2000 (KR) .................................. 2000-60950

(51) Int. Cl.[7] .............................................. F16H 61/02
(52) U.S. Cl. ................................ 701/55; 701/57; 477/3; 477/115; 477/118
(58) Field of Search ...................... 701/55, 57; 477/3, 477/115, 118, 120, 904, 906

(56) References Cited

U.S. PATENT DOCUMENTS

| 5,101,350 A | * | 3/1992 | Tokoro .................... 701/57 |
| 5,109,731 A | * | 5/1992 | Iwatsuki et al. ........ 477/115 |
| 5,611,753 A | * | 3/1997 | Kondo et al. ........... 477/118 |
| 5,655,995 A | * | 8/1997 | Kondo et al. ........... 477/155 |
| 5,833,570 A | * | 11/1998 | Tabata et al. ............. 477/3 |

* cited by examiner

Primary Examiner—William A. Cuchlinski, Jr.
Assistant Examiner—Marthe Marc-Coleman
(74) Attorney, Agent, or Firm—Birch, Stewart, Kolasch & Birch, LLP

(57) ABSTRACT

A shift control method and a system thereof of an automatic transmission equipped with a manual shift lever apply a modified shift pattern when a vehicle driving state satisfies a predetermined condition for changing a shift pattern during driving in a second speed range "22". This allows shifting to be managed suitably when a vehicle is either in a heavy-load state or a base state.

12 Claims, 3 Drawing Sheets

SHIFT CONTROL SYSTEM OF AN AUTOMATIC TRANSMISSION AND A METHOD THEREOF

CROSS-REFERENCE TO RELATED APPLICATION

This application claims priority of Korea patent Application No. 2000-60950, filed on Oct. 17, 2000.

BACKGROUND OF THE INVENTION (a) Field of the Invention

The present invention relates to a shift control system of an automatic transmission and a method thereof, and more particularly, to a shift control system of an automatic transmission and a method thereof for increasing the output torque of an automatic transmission provided with a manual shift range in which a driver can manually select a shift range.

(b) Description of the Related Art

Generally, an automatic transmission of a vehicle determines a shift range according to vehicle speed and throttle valve opening on the basis of a shift pattern stored in a memory of a TCU (Transmission Control Unit).

However, in a vehicle equipped with an automatic transmission provided with a manual shift range in which a driver can manually select a shift range, when the vehicle is running in a heavy-load state such as running on a steep slope or towing a trailer, the oil temperature of the transmission is easily increased by frequent shifting owing to insufficient driving force and slip, and thereby output torque is further reduced.

For example, if a vehicle equipped with a shift lever operating in the order of P-R-N-D-4-3-2 is driven in a second speed range "2" of the manual shift range 4-3-2 when running on a steep slope or towing a trailer, an actual shift range of the transmission is not fixed at a second speed even though the shift lever is in the range "2", but it can shift into a suitable speed between the first speed and the second speed corresponding to TCU (Transmission control unit) control according to a current driving state.

Such shifting into the first speed or the second speed is determined based on a predetermined shift pattern such as a 1⇌2 shift pattern shown in FIG. 6. In the 1⇌2 shift pattern of FIG. 6, a "1→2" shift pattern represents a critical state in which the speed range is shifted into the second speed from the first speed, while a "1←2" shift pattern represents a critical state in which the speed range is shifted into the first speed from the second speed. The "1→2" shift and "1←2" shift patterns are differentiated to avoid repeated shifting at a critical state. That is to say, there is hysteresis between the "1→2" shift pattern and the "1←2" shift pattern. As can be seen in the "1←2" shift pattern in FIG. 6, according to the prior art, the speed range is shifted into the first speed only if the throttle valve opening reaches near the maximum value.

Therefore, when a vehicle is running in a heavy-load state such as when running on a steep slope or towing a trailer, the output torque from the transmission remains insufficient because the speed range remains in the second speed even when a throttle valve is almost wide open. Therefore the vehicle speed is reduced by lack of torque and the slip of friction elements in the automatic transmission possibly occurs in such a heavy-load state.

Additionally, the temperature of the transmission oil increases because of frequent shifts between the first speed and the second speed, because the driver repeats the process of completely depressing the accelerator pedal to shift the speed range into the first speed in order to produce enough driving torque, and releasing it to escape from the rapid increase of the driving speed, because speed range shifting into the first speed in a full throttle state will provide an abrupt increase of output torque.

Therefore, it is an object of the present invention to provide a shift control system of an automatic transmission and a method thereof for improving the driving force by down-shifting into the first speed according to a predetermined modified shift pattern when a condition for changing a shift pattern is met, and thereby preventing the oil temperature of the transmission from being excessively increased, when a vehicle provided with a manual shift range is running in a second speed in a heavy-load state.

SUMMARY OF THE INVENTION

To achieve the above objective, the present invention provides a shift control method of an automatic transmission provided with manual shift ranges comprising determining whether a vehicle driving state satisfies a predetermined condition for changing a shift pattern to a predetermined modified shift pattern when an accelerator pedal is operated while a vehicle is being driven in a second speed range "2", and shifting into a first speed on the basis of the modified shift pattern if the vehicle driving state satisfies the predetermined condition for changing the shift pattern.

Preferably, the predetermined condition for changing the shift pattern is set as being that a sportiness index is greater than a predetermined value and a slope degree is greater than a predetermined value.

Said slope degree is calculated on the basis of a surplus driving force obtained by subtracting vehicle rolling resistance from an actual torque of an engine and an actual vehicle acceleration.

Preferably, a relevant portion of a 1←2 shift pattern of the modified shift pattern is formed with a curve such that the curve linearly rises from a first throttle valve opening at a first predetermined vehicle speed to a second throttle valve opening at a second predetermined vehicle speed, and the first predetermined vehicle speed and the second predetermined vehicle speed are respectively set as 20 km/h and 40 km/h, and the first throttle valve opening and the second throttle valve opening are respectively set as 20% and 60%.

Further, the predetermined condition for changing the shift pattern in order to increase the driving force is set as being that a vehicle speed is lower than a predetermined value and a throttle valve opening is greater than a predetermined value. The predetermined throttle valve opening is set as 20% to 60%, linearly corresponding with a vehicle speed of 20 km/h to 40 km/h.

The present invention also provides a shift control system for controlling an automatic transmission provided with manual shift ranges including a second speed range "2", comprising a vehicle state detector for detecting a driving state of a vehicle, and a transmission control unit for determining whether the vehicle driving state satisfies a predetermined condition for changing a shift pattern to a predetermined modified shift pattern when an accelerator pedal is operated during driving in the second speed range "2", and for generating a control signal to allow the shift range to shift into a first speed according to the modified shift pattern when the vehicle driving state satisfies the predetermined condition for changing the shift pattern.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

A shift control system of an automatic transmission according to a preferred embodiment of the present invention has the following features.

(1) Improvement of driving force in a heavy-load state.

The shift control system of an automatic transmission according to a preferred embodiment of the present invention allows for an increase in driving force of a vehicle at a relatively high vehicle speed with a low throttle opening by applying a modified shift pattern to facilitate downshifting to the first speed, when a vehicle equipped with an automatic transmission provided with a manual shift range is running in its second speed range in a heavy-load state such as running on a steep slope or towing a trailer.

(2) Stabilization of the oil temperature of a transmission in a heavy-load state.

The shift control system of an automatic transmission according to a preferred embodiment of the present invention increases driving force at a relatively high vehicle speed and low throttle opening compared with the prior art by facilitating downshifting to the first speed based on a modified shift pattern, and thereby the oil temperature of the transmission is prevented from increasing by preventing frequent shifting between the first speed and the second speed when an automatic transmission vehicle provided with a manual shift lever runs in a heavy-load state during driving in the second speed range "2".

Figure 1:
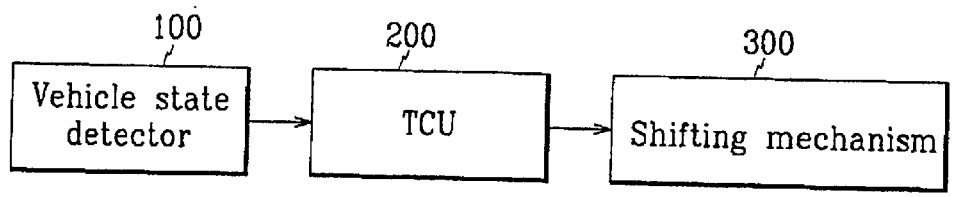
FIG. 1 is a block diagram of a shift control system according to a preferred embodiment of the present invention.

FIG. 1 is a block diagram of a shift control system according to a preferred embodiment of the present invention.

As shown in FIG. 1, a shift control system according to the present invention includes a vehicle state detector 100, a TCU (transmission control unit) 200, and a shifting mechanism 300.

The vehicle state detector 100 detects vehicle speed, engine torque, vehicle acceleration and engine load, and outputs corresponding electric signals.

Said electric signals are outputted by any method of the various general methods. For example, a vehicle speed detector detects a vehicle speed and outputs a signal corresponding to the vehicle speed, an engine control unit detects engine torque based on throttle valve opening and engine speed and outputs a signal corresponding to the engine torque, an engine control unit detects vehicle acceleration by differentiating the vehicle speed detected by the vehicle speed detector and outputs a signal corresponding to the vehicle acceleration, and a throttle position sensor detects engine load and outputs a signal corresponding to the engine load.

The TCU 200 determines whether a predetermined condition for changing a 1-2 shift pattern is satisfied on the basis of the signal received from the vehicle state detector 100. If the predetermined condition for changing the 1-2 shift pattern is satisfied, the TCU 200 changes the shift pattern to a modified shift pattern stored in a memory of the TCU 200 and outputs a control signal for a downshift into the first speed according to the modified shift pattern.

The shifting mechanism 300 downshifts a shift range from the second speed to the first speed by controlling the flow of hydraulic pressure according to the control signal received from the TCU 200.

With the above structure, a shift control system of an automatic transmission according to a preferred embodiment of the present invention will now be described in detail.

Figure 2:
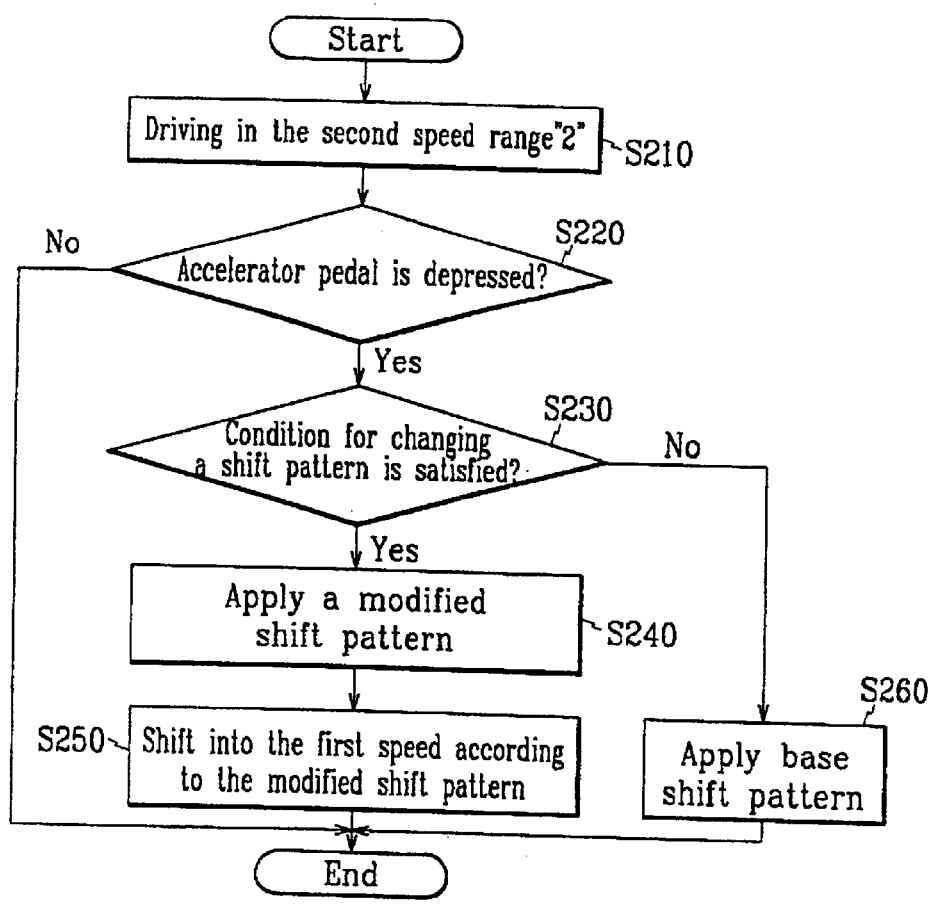
FIG. 2 is a flowchart showing a shift control method according to a preferred embodiment of the present invention.

FIG. 2 shows a method for the shifting mechanism 300 to downshift into the first speed in the case of a vehicle running in a heavy-load state during driving in the second speed range "2".

As shown FIG. 2, in the vehicle applying a shift control system of an automatic transmission according to the present invention, an accelerator pedal is depressed in order to increase the driving force against reduction of the vehicle speed when the vehicle is running in a heavy-load state, such as running on a steep slope or towing a trailer, during driving in the second speed range "2" as in step S210.

The TCU 200 determines whether the accelerator pedal is depressed at step S220, and a shift pattern is not shifted in the case it isn't depressed. The TCU 200 then determines whether a vehicle driving state satisfies a predetermined condition for changing a shift pattern to a predetermined modified shift pattern in the case of an on-state at step S230.

Figure 3:
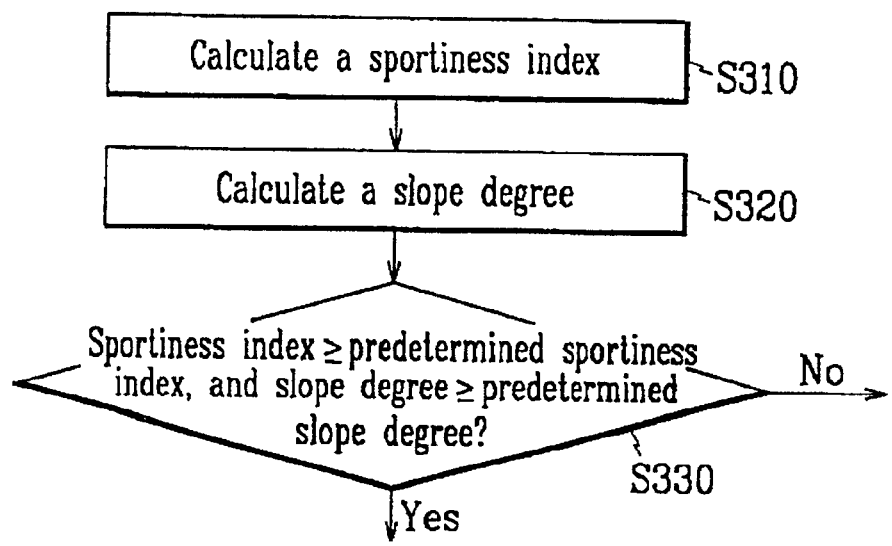
FIG. 3 is a flowchart showing a method of detecting satisfaction of a predetermined condition for changing to a modified shift pattern in FIG. 2.
Figure 4:
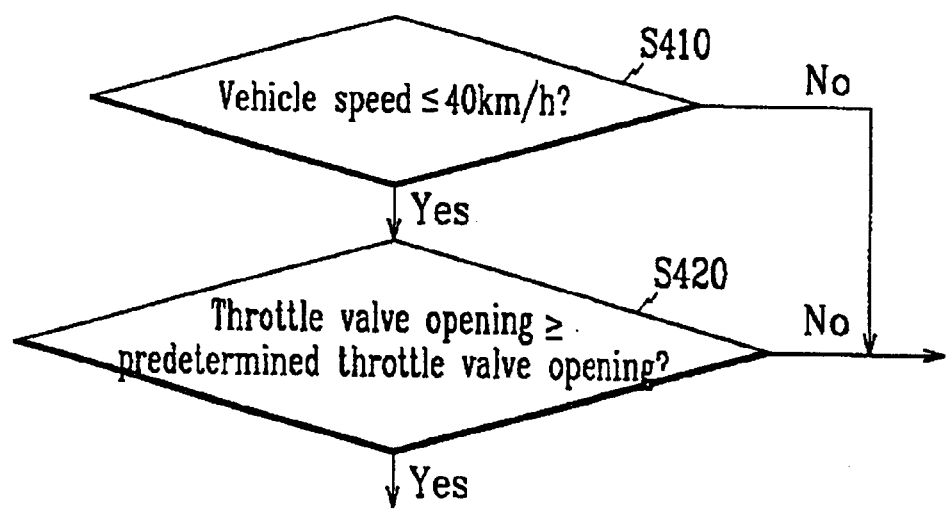
FIG. 4 is a flowchart showing another method of detecting satisfaction of a predetermined condition for changing to a modified shift pattern in FIG. 2.

The predetermined condition for changing the shift pattern may be based on any determination method that is able to determine a heavy-load state. FIGS. 3 and 4 show examples of methods of the determination step (S230) for detecting satisfaction of the predetermined condition for changing the shift pattern.

Referring to FIG. 3, a method of detecting satisfaction of a predetermined condition for changing the shift pattern will hereinafter be described.

First, the TCU 200 calculates a sportiness index of vehicle driving at step S310. The sportiness index, which is to quantify how sportily a vehicle is being driven, is calculated on the basis of various calculating methods, and for example, it may be obtained by multiplying a quantified number based on detection of engine load which is based on throttle valve opening by a quantified number based on detection of vehicle acceleration.

Further, a slope degree of a road surface is detected in the driven vehicle at step S320. The slope degree of the road surface may be calculated by determining a current vehicle acceleration force and comparing it with a predetermined acceleration force with respect to a detected current engine torque force, and calculating a driving resistance force based on the difference.

For example, a vehicle will be accelerated with a force 90 when an engine force is 100 and a driving resistance force is 10. However, if the force of actual acceleration is lower than such force, the vehicle will be appreciated as being in a heavy-load state such that the apparent weight of the vehicle is greater than that of its design, such as when towing a trailer or running on a slope. Accordingly, the slope degree of a road surface may be calculated based on the driving resistance force.

The TCU 200 determines, at step S330, whether the sportiness index is greater than a predetermined value and the slope degree is greater than a predetermined value.

Referring again to FIG. 2, if both the above conditions are met, the TCU 200 determines at step S230 that the driving state satisfies the predetermined condition for changing the shift pattern, and a modified shift pattern is applied at step S240. Otherwise, a base shift pattern is maintained at step S260.

Figure 5:
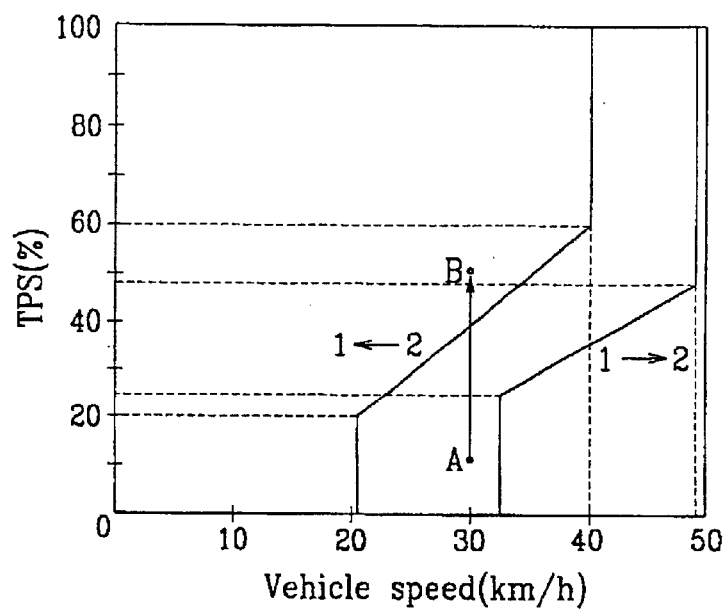
FIG. 5 illustrates a modified 1⇆2 shift pattern for improving the driving force of an automatic transmission according to a preferred embodiment of the present invention.

The modified shift pattern, to easily downshift into the first speed, is represented by the left curve of FIG. 5. The relevant portion of the curve linearly rises from the throttle valve opening of 20% to that of 60%, respectively corresponding to vehicle speeds of 20 km/h to 40 km.

Figure 6:
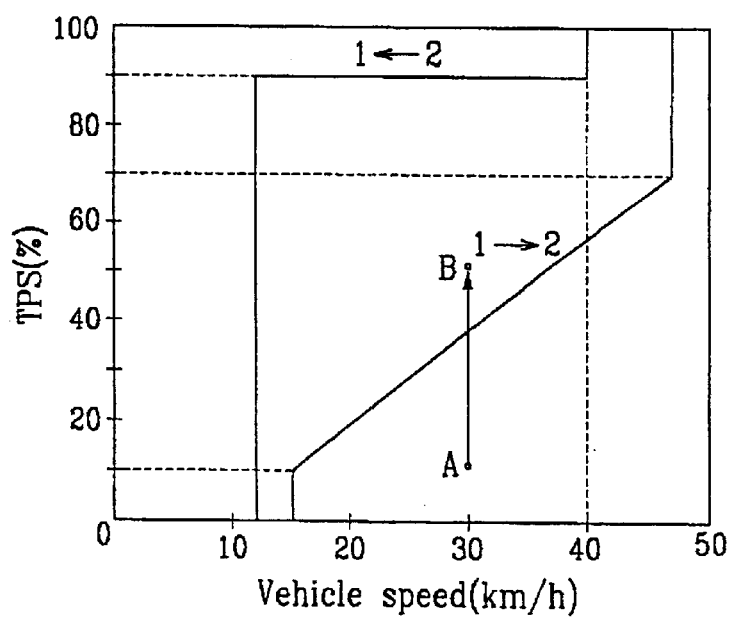
FIG. 6 illustrates a base 1⇆2 shift pattern of an automatic transmission according to the present invention and the prior art.

Accordingly, with the modified shift pattern, the TCU 200 may downshift a shift range into the first speed in a heavy-load state at a relatively high speed and low throttle valve opening as compared with the prior art shown in FIG. 6.

The TCU 200 outputs a control signal to allow a shift range to shift into the first speed when the shift condition of the first speed is satisfied, using the modified shift pattern, and thereby the shifting mechanism 300 controls a flow of hydraulic pressure and allows the downshift from the second speed to the first speed at step S250.

For example, as shown in FIG. 5, when being changed from the "A" state to the "B" state by depressing the accelerator pedal, the shift range is downshifted from the second speed to the first speed. When the shift range is downshifted from the second speed to the first speed, the TCU 200 returns to the main routine.

FIG. 4 is a flowchart showing another method of detecting satisfaction of a predetermined condition for changing to the modified shift pattern.

The predetermined condition for changing the shift pattern according to this embodiment is set as being that the vehicle speed is lower than a predetermined value and the throttle valve opening is greater than a predetermined value, as shown in FIG. 4.

That is to say, the TCU 200 determines whether the vehicle speed is lower than the predetermined value at step S410 and the throttle valve opening is greater than the predetermined value at step S420. The TCU then determines that the change condition is satisfied when the results of the two determination steps are "yes", otherwise the change condition is not satisfied.

The predetermined vehicle speed is set as 40 km/h in order to correspond to the modified "1←2" shift pattern as shown in FIG. 5. The predetermined throttle valve opening is set as linearly rising from 20% to 60% respectively corresponding to a vehicle speed of from 20 km/h to 40 km/h, also in order to correspond to the modified "1←2" shift pattern.

Table 1 below shows data representing the transmission oil temperature and the like, respectively while driving a vehicle applying a shift control system of an automatic transmission according to the preferred embodiment of the present invention and a vehicle applying a TCU system of the prior art.

TABLE 1

Contrast Table of Driving Test Results

|  | According to TCU of the prior art | According to TCU of the present invention |
|---|---|---|
| Shift lever | 2 | 2 |
| Shift range | Second speed | First speed |
| Coolant temperature (.) | 113 | 116 |
| Temperature of transmission oil (.) | 188 | 160 |
| Engine speed (rpm) | 2400 | 3400 |
| Driven time (min) | 14 | 30 |

The test conditions differed only with respect to the TCU, and the same type of vehicle was used. The loading condition was set as being when the vehicle runs on a slope of 12% or tows a trailer of 2100 kg at a driving speed of 30 km/h, with an outside temperature of 27.

As shown in Table 1, because of driving in the first speed range at a higher engine speed and the same driving speed as with the prior art TCU, the driving force may be increased as compared to the prior art with the throttle opening being less than that needed in the prior art to run in the first speed range, and consequently the temperature of the transmission oil is lowered to when a vehicle applies the TCU according to the present invention.

As described above, when the vehicle is running in a heavy-load state, such as running on a steep slope or towing a trailer during driving in the second speed range "2", a shift control system of an automatic transmission according to the present invention may downshift a shift range into the first speed according to a modified shift pattern to increase the driving force of the vehicle.

Therefore, a shift control system according to a preferred embodiment of the present invention may increase the driving force at a relatively high vehicle speed and low throttle opening compared with the prior art, and it stabilizes the temperature of the transmission oil by preventing frequent shifting between the first speed and the second speed caused by a reduction of the driving speed and a consequent increase in slip.

While this invention has been described in connection with what is presently considered to be the most practical and preferred embodiment, it is to be understood that the invention is not limited to the disclosed embodiments, but, on the contrary, is intended to cover various modifications and equivalent arrangements included within the sprit and scope of the appended claims.

What is claimed is:

1. A shift control method of an automatic transmission provided with manual shift ranges, comprising:
    determining whether a vehicle driving state satisfies a predetermined condition for changing a shift pattern to a predetermined modified shift pattern when an accelerator pedal is operated while a vehicle is being driven in a second speed range "2"; and
    shifting into a first speed on the basis of the modified shift pattern if the vehicle driving state satisfies the predetermined condition for changing the shift pattern.

2. The method of claim 1, wherein the predetermined condition for changing the shift pattern is set as being that a sportiness index is greater than a predetermined value and a slope degree is greater than a predetermined value.

3. The method of claim 2, wherein said slope degree is calculated on the basis of a surplus driving force obtained by subtracting vehicle rolling resistance from an actual torque of an engine and an actual vehicle acceleration.

4. The method of claim 2, wherein said sportiness index is calculated on the basis of an engine load calculated from a throttle valve opening and a vehicle acceleration.

5. The method of claim 1, wherein a relevant portion of a 1←2 shift pattern of the modified shift pattern is formed with a curve such that the curve linearly rises from a first throttle valve opening at a first predetermined vehicle speed to a second throttle valve opening at a second predetermined vehicle speed.

6. The method of claim 5, wherein the first predetermined vehicle speed and the second predetermined vehicle speed are respectively set as 20 km/h and 40 km/h, and the first throttle valve opening and the second throttle valve opening are respectively set as 20% and 60%.

7. The method of claim 1, wherein the predetermined condition for changing the shift pattern in order to increase the driving force is set as being that a vehicle speed is lower than a predetermined value and a throttle valve opening is greater than a predetermined value.

8. The method of claim 7, wherein the predetermined throttle valve opening is set as 20% to 60%, linearly corresponding with a vehicle speed of 20 km/h to 40 km/h.

9. A shift control system for controlling an automatic transmission provided with manual shift ranges including a second speed range "2", comprising:

a vehicle state detector for detecting a driving state of a vehicle; and a transmission control unit for determining whether the vehicle driving state satisfies a predetermined condition for changing a shift pattern to a predetermined modified shift pattern when an accelerator pedal is operated during driving in the second speed range "2", and for generating a control signal to allow the shift range to shift into a first speed according to the modified shift pattern when the vehicle driving state satisfies the predetermined condition for changing the shift pattern.

10. The system of claim 9, wherein the predetermined condition for changing the shift pattern is set as being that a sportiness index is greater than a predetermined value and a slope degree is greater than a predetermined value, the sportiness index being calculated on the basis of an engine load calculated from a throttle valve opening and a vehicle acceleration.

11. The system of claim 10, wherein said slope degree is calculated on the basis of a surplus driving force obtained by subtracting vehicle rolling resistance from an actual torque of an engine and an actual vehicle acceleration.

12. The system of claim 9, wherein a relevant portion of a 1←2 shift pattern of the modified shift pattern is formed with a curve such that the curve linearly rises from a first throttle valve opening at a first predetermined vehicle speed to a second throttle valve opening at a second predetermined vehicle speed.

* * * * *